United States Patent [19]
Tomaru et al.

[11] Patent Number: 5,677,004
[45] Date of Patent: Oct. 14, 1997

[54] COATING METHOD INCLUDING APPLICATION OF A PRECOAT SOLUTION IN ADVANCE OF COATING COMPOSITION

[75] Inventors: Mikio Tomaru; Norio Shibata; Shinsuke Takahashi, all of Kanagawa, Japan

[73] Assignee: Fuji Photo Film Co., Ltd., Kanagawa, Japan

[21] Appl. No.: 568,584

[22] Filed: Dec. 7, 1995

[30] Foreign Application Priority Data

Dec. 20, 1994 [JP] Japan .................... 6-334570

[51] Int. Cl.$^6$ .................................... B05D 3/00
[52] U.S. Cl. ................ 427/299; 427/407.1; 427/434.2
[58] Field of Search ..................... 427/299, 407.1, 427/434.2

[56] References Cited

U.S. PATENT DOCUMENTS

| | | | |
|---|---|---|---|
| 4,283,443 | 8/1981 | Choinski | 427/434.2 |
| 4,480,583 | 11/1984 | Tanaka et al. | 118/410 |
| 4,537,801 | 8/1985 | Takeda | 427/356 |
| 4,907,530 | 3/1990 | Shibata et al. | 118/410 |
| 5,250,320 | 10/1993 | Suzuki et al. | 427/434.2 |
| 5,302,206 | 4/1994 | Shibata et al. | 118/410 |

*Primary Examiner*—Janyce Bell
*Attorney, Agent, or Firm*—Sughrue, Mion, Zinn, Macpeak & Seas, PLLC

[57] ABSTRACT

In the condition that a support is liquid-sealed with a precoat solution mainly containing a solvent and being applied onto the coating surface of the support in advance, a coating composition, prepared by dispersing powder of a mean particle size not larger than 0.4 μm, is applied so as to be laminated onto the precoat solution by means of an extrusion head. The extrusion head has a front edge located at the upstream side with respect to the direction of movement of the support, and a back edge located at the downstream side with respect to the direction of movement of the support so that an end of the back edge retreats farther from the support with a difference in level than the front edge. The wet film thickness of the precoat solution is made to be in a range not larger than 1/3 of the wet film thickness of the coating composition. A coating method in which the surface quality of a coating film formed on a surface of a support can be improved is therefore provided.

6 Claims, 2 Drawing Sheets

COATING METHOD INCLUDING APPLICATION OF A PRECOAT SOLUTION IN ADVANCE OF COATING COMPOSITION

BACKGROUND OF THE INVENTION

The present invention relates to a method of applying a coating composition onto the surface of a support and, more particularly, to a method in which a solution prepared by dissolving a photographic light-sensitive material, a magnetic material, or the like, in a solvent is applied onto the surface of the support by using a non-pressure type extrusion coating head.

As a method of producing various kinds of photographic films, print paper, magnetic recording media, or the like, a method has conventionally been used, in which a coating composition is prepared by dissolving a photographic light-sensitive material, a magnetic material, various kinds of treating agents, or the like, into a solvent such as an organic solvent, or the like, and extruded from a slit provided in a coating head so that the coating composition is applied onto the surface of a long running-support to thereby form, on the surface of the support, a coating film of these materials.

The aforementioned coating film is generally designed so as to have a multilayered structure. Accordingly, there is employed a method (wet-on-dry method) in which a multi-layered coating film is formed by repeating a monolayer coating and drying process. Alternatively, there is employed a method (wet-on-wet method) in which coating heads of the same number as the number of layers are arranged side by side along the direction of the movement of a support, or a coating head formed by arranging slits of the same number as the number of layers is used so that layers of wet-state coating compositions are laminated by extruding the coating composition simultaneously from each of the slits onto the surface of the support.

Of these two methods, the wet-on-wet method has an advantage because a large number of layers can be formed continuously. For example, the wet-on-wet coating method is disclosed in Unexamined Japanese Patent Publication Nos. Sho-61-13929, Sho-58-205561, etc. The coating method disclosed in these Publications is a so-called pressure type coating method in which the coating compositions, extruded onto the coating surface of a long running-support from the respective slits of a coating head called an extruder (extrusion coating head) having a back edge being brought into contact with the support, are weighed while pressurized by the back edge so that a coating layer having a desired weight is formed on the support.

In the case of pressure type coating, there is however a problem in that a uniform coated surface cannot be obtained because the coating composition is pressed against the support at the back edge surface so that an influence due to unevenness in thickness and stiffness of the support acts on the coating surface easily.

Therefore, not only to solve such a problem in the pressure type coating but also to make higher-speed, thin-layer coating possible, for example, a non-pressure type extruder has been developed as is disclosed in Unexamined Japanese Patent Publication No. Sho-63-20069.

This non-pressure type extruder comprises a front edge located at the upstream side with respect to the moving direction of the running of the support, and a back edge located at the downstream side, and is designed so as to have a structure in which a difference in level is provided so that an end portion of the back edge retreats farther from the support than an end portion of the front edge.

A coating composition is extruded, toward the support, from a slit formed between the front and back edges. In this configuration, the back edge is not in contact with the aforementioned support, so that the aforementioned coating composition is applied without being subjected to any smoothing function by the back edge surface.

Further, in the coating method using this non-pressure type extruder, so-called liquid sealing in which the upstream side is sealed with a precoat solution is performed in order to improve the coating performance.

This liquid sealing is a process in which a precoat solution is applied onto the coating surface of the support at the upstream side of the extruder so that a gap between the front edge surface and the support is sealed with the precoat solution as well as an excess of the precoat solution is scraped off by the front edge when the support reaches the extruder.

Hence, air can be prevented from mixing into the coating composition, or the coating surface of the support can be made even regardless of the surface state thereof. Further, the coating composition can be prevented from unexpected behavior disorder caused by excessive pressure against the coating composition, so that high-speed, thin-layer coating performance can be improved.

Furthermore, dust deposited on the support is taken into the precoat solution so that the dust as well as the excess of the precoat solution can be removed by the front edge when the support reaches the extruder. Accordingly, no foreign matter is nipped in the end portion of the back edge.

The coating composition is extruded from the slit and passed through the front edge, so that the coating composition is laminated on the precoat layer having a defined film thickness to thereby form a coating layer. The coating layer is provided as a thin film in a good state in which stripe irregularity and the deviations in film thickness are prevented by the function of the precoat solution as described above. Accordingly, this non-pressure type coating method is very suitable particularly for high-speed thin-layer coating.

Incidentally, with the advance of the recording performance of magnetic recording media, finely pulverizing magnetic particles contained in the magnetic layer formed on the support and smoothing the surface of the magnetic layer have been required more and more in recent years. Besides the magnetic recording media, products such as various kinds of photographic films, print paper, etc., each having a coating film formed on the surface of a support have been required to be improved in the surface quality thereof.

In the aforementioned non-pressure type coating method, however, it has been newly discovered that in the case where solid particles such as magnetic particles, or the like, contained in the coating composition are made finer, there arises a problem in that a solvent shock is caused by contact between the precoat solution and the coating composition to thereby aggregate the solid particles contained in the coating composition, or the arrangement of the solid particles is disordered to thereby deteriorate the surface quality of a coating film formed on the support when the solvent in the precoat solution passes between the solid particles contained in the coating composition at the time of drying.

SUMMARY OF THE INVENTION

Upon the aforementioned circumstances, it is an object of the present invention to provide a coating method in which the occurrence of failures such as the deviation in thickness of a coating film formed on the surface of a support, generation of stripes, etc., can be prevented, so that products having a good surface quality of the coating film can be produced stably.

The foregoing object of the present invention can be achieved by a coating method in which in the condition that a support is liquid-sealed with a precoat solution mainly containing a solvent and being applied onto the coating surface of the support in advance, a coating composition, prepared by dispersing powder of mean particle size not larger than 0.4 µm, is applied and laminated onto the precoat solution by means of an extrusion head. The extrusion head has a front edge located at the upstream side with respect to the direction of the movement of the support, and a back edge located at the downstream side with respect to the direction of the movement of the support so that an end of the back edge retreats farther from the support with a difference in level than the front edge. The wet film thickness of the precoat solution is in a range of from 1/5 to 1/130 as large as the wet film thickness of the coating composition.

Preferably, the sum of the wet film thickness of the precoat solution and the wet film thickness of the coating composition is in a range of from 1.2 µm to 40 µm.

The boiling point of the main solvent (which means one solvent of the largest containing ratio among various solvents, or means a solvent singly contained) of the precoat solution is made to be not lower than the boiling point of the main solvent of the coating composition.

The parameter $\chi$ of a binding agent in the precoat solution is made to be smaller than 0.5, where the parameter $\chi$ is expressed by $\chi=0.5-A2\cdot V\cdot\rho^2$ in which A2 is a second virial coefficient, V is the molar volume of the solvent, and $\rho$ is polymer density. The binding agent contained in the coating composition is made to have at least one kind of polar group selected from the polar groups of —OH, —COOH, —$SO_3M$, —$OSO_3M$, —$PO_3M_2$, and —$OPO_3M_2$, (where M represents any one of a hydrogen atom, an alkaline metal atom or an ammonium group).

The precoat solution may contain only a solvent or may contain, by 0.1~10 weight %, a high-molecular compound having an average molecular weight of from 10,000 to 500,000.

Further, an undercoat composition of a main solvent containing a high-molecular compound having an average molecular weight of from 10,000 to 500,000 may be coated on a support to thereby form an undercoat layer in advance so that the precoat solution and the coating composition are applied onto the undercoat layer.

According to the aforementioned present invention, in the aforementioned non-pressure type coating method, it is estimated that the aggregation of solid particles in the coating composition can be avoided because the occurrence of a solvent shock is prevented by contact between the precoat solution and the coating composition even in the case where solid particles of a magnetic material, or the like, contained in the coating composition are made finer, and that it is possible to effectively prevent deterioration of the surface quality of a coating film caused by disorder of the arrangement of the solid particles when the solvent in the precoat solution passes between the solid particles of the coating composition at the time of drying. Accordingly, the occurrence of failures such as deviations in thickness of the coating film formed on the surface of the support, the generation of stripes, etc., can be prevented.

DETAILED DESCRIPTION OF THE PREFERRED EMBODIMENTS

An embodiment of a coating method according to the present invention will be described below in detail.

Figure 1:
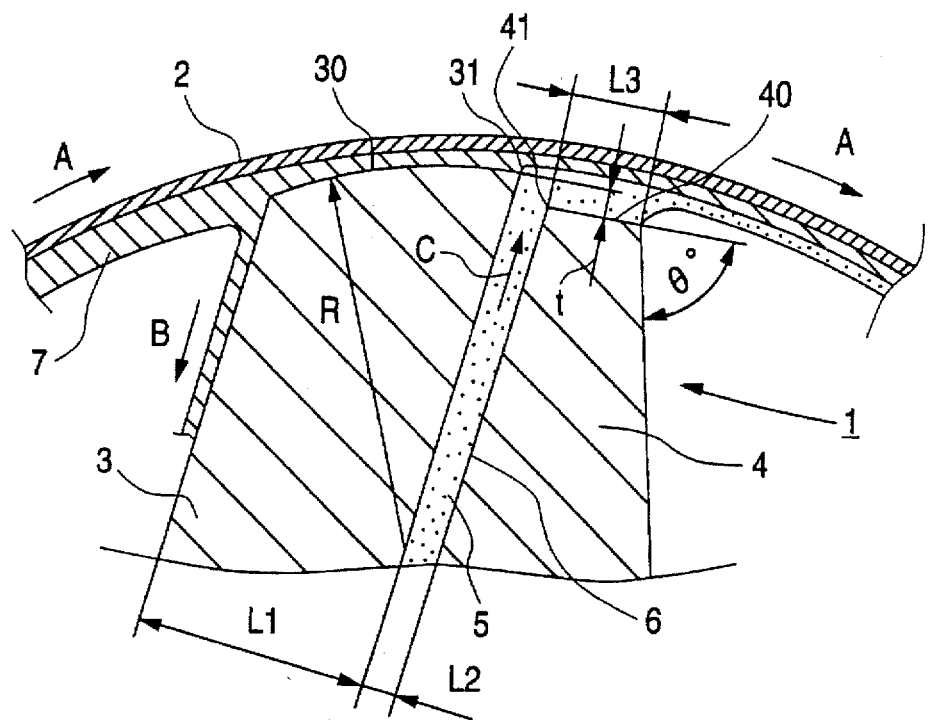
FIG. 1 is a sectional view of an extruder according to the present invention.

As shown in FIG. 1, an end surface 30 of a front edge 3 of a coating head 1 used in the coating method of this embodiment is shaped like a circular arc as shown in the drawing, although another shape may be used as long as the shape is convexly curved. Further, the, shape of a back edge 4 is not specifically limited as long as the back edge 4 retreats farther from a support 2 than the front edge 3. Incidentally, when an edge portion to form a coating composition release point is preferably at the downstream side, stable coating which is low in the occurrence of coating stripes can be performed. Although the drawing shows that the end surface 40 of the aforementioned back edge 4 has a configuration with a relatively large width L3, the size thereof is not specifically limited and the end surface 40 of the back edge 4 is a region having a function of releasing discharge pressure of a coating composition 5 discharged from a slit 6.

Figure 2:
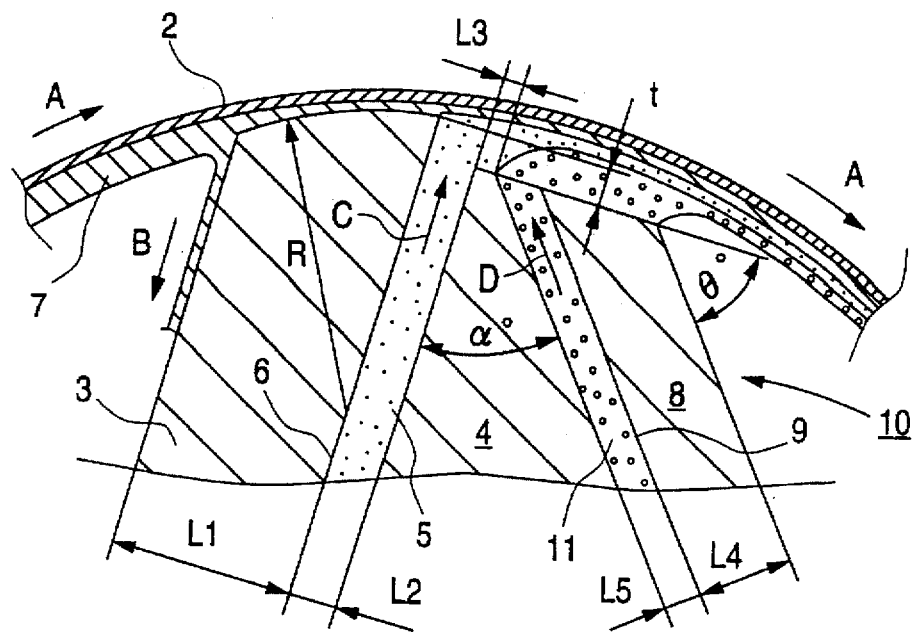
FIG. 2 is a sectional view of another extruder according to the present invention.

Incidentally, in the case where two or more coating layers are to be formed simultaneously, a coating head 10 shaped as shown in FIG. 2 is used.

The aforementioned support 2 is formed of a film of flexible plastics such as polyethylene terephthalate, polyethylene naphthalate, aramid, etc. Alternatively, another material can be selected if the material has impermeability with respect to a precoat solution 7.

The aforementioned coating composition 5 is prepared by dispersing an inorganic powder binding agent having a mean particle size not larger than of 0.4 µm or smaller (mean major axis of 0.4 µm or smaller in needle-like particles) in a solvent.

The aforementioned binding agent has at least one kind of polar group selected from the groups of —OH, —COOH, —$SO_3M$, —$OSO_3M$, —$PO_3M_2$ and $_{OPO3}M_2$ (in which M represents a hydrogen, alkaline metal or an ammonium group).

These polar groups are adsorbed, through absorbed water, onto an inorganic powder oxide which is present on the surfaces of inorganic powder. By this, the binding agent is prevented from departing from the inorganic powder and, accordingly, the inorganic powder can be prevented from aggregating even in the case where the coating composition 5 is in contact with the precoat solution 7 low in solid concentration. In the case where two or more coating layers are to be provided, the same condition as described above is applied to coating compositions required for forming all the layers.

Further, when the binding agent contained in the coating composition 5 has poor solubility with respect to the precoat solution 7, the binding agent contracts to cause the aggregation of the inorganic powder in a moment when the coating composition 5 comes into contact with the precoat solution 7. Therefore, a parameter $\chi$ of the binding agent in the precoat solution 7 is adjusted so as to be smaller than 0.5.

Here, the aforementioned parameter χ is given by the following expression, where A2 is a second virial coefficient, V is the molar volume of the solvent, and ρ is polymer density.

$$\chi = 0.5 - A2 \cdot V \cdot \rho^2$$

As a method of obtaining the aforementioned second virial coefficient, a method using osmotic pressure or static light scattering is known generally. A more detailed discussion is disclosed in such literature as "Introduction to Polymers" (written by R. J. Young and P. A. Lovell, and published by Chapman & Hall, London, 1991).

To disperse inorganic powder in a solvent, a kneader, an extruder, a ball mill, a sand grinder, etc., may be used preferably as known conventionally. As occasion demands, dispersion may be made after the surfaces of inorganic powder are made lipophilic.

A solvent may be used singly as the precoat solution 7 or a solvent solution containing 0.1 to 10% by weight of a high-molecular compound may be used as the precoat solution 7 in order to improve strength in adhesion between the coating film and the support. Alternatively, a solution containing inorganic powder may be used as the precoat solution 7 in order to provide another function. The solvent-mainly-containing precoat solution used in the present invention means a solution containing 90% by weight or more of a solvent such as methyl ethyl ketone, acetone, methyl isobutyl ketone, etc.

It has been found that when a solvent which vaporizes more easily than the main solvent of the coating composition is used as a solvent (called a main solvent) most mainly contained in the precoat solution, the solvent of the precoat solution and the solvent of the coating composition are mixed violently in the drying process to deteriorate the characteristic of the coating surface.

Therefore, the boiling point of the main solvent of the precoat solution is selected to be not lower than the boiling point of the main solvent of the coating composition. Further, by selecting the average molecular weight of the high-molecular compound in the precoat solution to be in a range of 10,000 to 500,000, the high-molecular compound can be prevented from dispersing into the coating composition in the drying process, so that not only the force of adhering the precoat solution to the support can be secured but also the surface quality of the coating film can be kept good.

The precoat solution 7 is applied onto the surface of the support 2 in advance by a generally used and known coating apparatus such as a gravure coater, a roll coater, blade coater, extrusion coater, etc.

Then, the support 2 is made to be opposite to the front edge 3 of the coating head 1 after it has run suitably, so that a gap between the support 2 and the front edge 3 is filled with the precoat solution 7. A part of the precoat solution 7 may be scraped off by the front edge 3.

It has been found that good coating is made by selecting the wet film thickness of the precoat solution 7 to be not larger than ⅓ the wet film thickness of the coating composition 5.

Here, the wet film thickness (unit: cc/m²) of the precoat solution 7 is determined by measuring the quantity of deposition thereof as follows.

First, the applied quantity of the precoat solution 7 is obtained on the basis of the difference between the supplied quantity of the precoat solution and the residual quantity of the same. In the case where the precoat solution 7 is not scraped off by the front edge 3, the wet film thickness of the precoat solution 7 can be obtained by dividing the applied quantity of the coating composition 7 by the specific gravity and the applied area thereof.

Further, in the case where the precoat solution 7 is to be scraped off by the front edge 3, the scraped-off quantity thereof is measured and then a quantity obtained by subtracting the scraped-off quantity from the applied quantity of the precoat solution 7 is divided by the specific gravity and applied area thereof to thereby make it possible to obtain the wet film thickness of the precoat solution 7.

On the other hand, the wet film thickness of the coating composition 5 can be obtained by dividing the flow rate of the coating composition 5 by the specific gravity and the applied area of the coating composition 5.

When the sum of the wet film thickness of the precoat solution 7 and the wet film thickness of the coating composition 5 is selected to be not larger than 40 μm, Benard convection cells are caused by a coating composition convecting phenomenon so that the surface of the coating film can be prevented from being roughened.

Incidentally, in the case where two or more layers of coating compositions 5 are to be applied simultaneously, the sum of the wet film thicknesses of all the coating compositions 5 is used as the aforementioned wet film thickness of the coating composition 5.

In the case where a binding agent is made to be contained in the precoat solution 7 to attain the improvement of the adhesion property of the coating film with respect to the support 2, the precoat solution 7 having a larger film thickness is preferred because the adhesion property becomes high. To avoid the roughening of the surface of the coating film, however, the thickness of the coating film is limited as described above.

Therefore, after an undercoat solution formed of a solvent solution containing a high-molecular compound having an average molecular weight of from 10,000 to 500,000 is applied onto the surface of the support 2 and dried, the precoat solution 7 is applied and the coating composition 5 is applied while the precoat solution 7 is wet in accordance with the present invention. As a result, both a high adhesion property and a good surface quality of the coating film can be achieved.

EXAMPLES

Examples will be described below.

In each of the following examples, polyethylene terephthalate with the thickness of 14μm was used as the support 2. Further, the precoat solution 7 was applied onto the surface of the support 2 at the rate of 8 cc/m² by a roll coater.

As a coating head used for monolayer coating, there was used the coating head 1 shown in FIG. 1. The size L1 indicating the width of the front edge 3 was selected to be 2 mm; the size L2 indicating the width of the slit 6 was selected to be 0.5 mm; the size L3 indicating the width of the back edge end surface 40 was selected to be 1 mm; the radius R of the front edge end surface 30 was selected to be 4 mm; the difference t in level between the front edge end surface 30 and the back edge end surface 40 was selected to be 0.06 mm; and the angle θ of the rear wall surface of the back edge 4 was selected to be 60 degrees.

As a coating head used for two-layer coating, there was used the coating head 10 shown in FIG. 2. The size L1 was selected to be 2 mm; the size L2 was selected to be 0.5 mm; the size L3 was selected to be 1 mm; the radius R was selected to be 4 mm; the difference t in level was selected to be 0.06 mm; the angle θ was selected to be 60 degrees; the size L4 indicating the width of the second back edge 8 was selected to be 0.7 mm; the size L5 indicating the width of the second slit 9 was selected to be 0.3 mm; and the angle α between the first slit 5 and second slit 9 was selected to be 30°.

Because the change of the coating speed in a range of from 50 m/min to 1,000 m/min had no effect on the surface quality of the coating film, the coating speed was fixed to 400 m/min.

Methyl ethyl ketone was used as the precoat solution.

After components shown in Table 1 were kneaded by a kneader, 5 g of methyl ethyl ketone per 1 g of inorganic powder was added thereto and the inorganic powder was dispersed by a sand grinder to thereby prepare a coating composition A.

Figure 3:
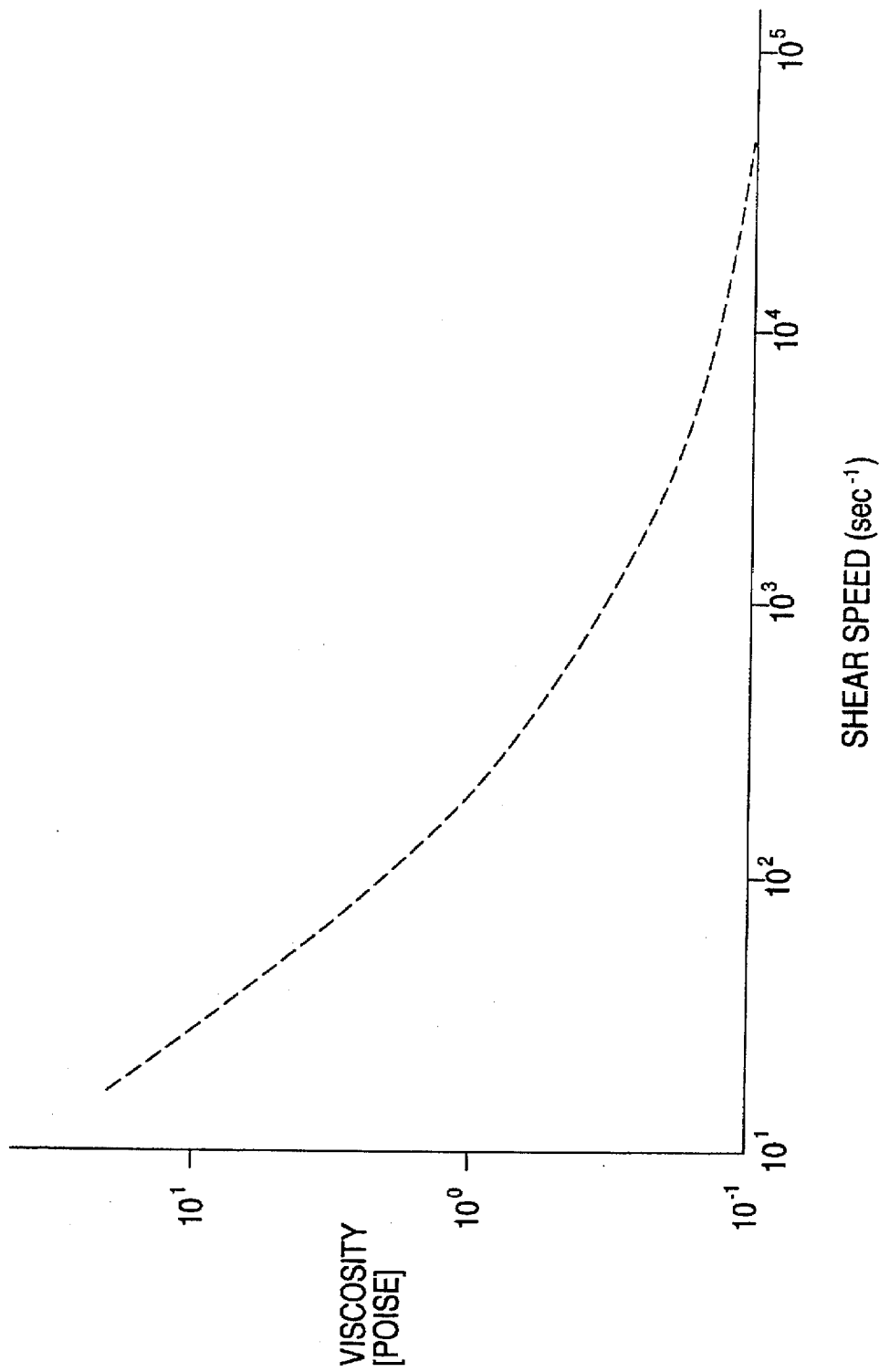
FIG. 3 is a graph showing the thixotropic viscosity characteristic of a coating composition.

The viscosity of the coating composition A thus prepared was measured by a Rotovisko viscometer. As a result, the coating composition A exhibited a thixotropic viscosity characteristic in which the viscosity decreased as the shear speed increased, as shown in the graph of FIG. 3.

After components shown in Table 2 were kneaded by a kneader, 5 g of methyl ethyl ketone per 1 g of inorganic powder was added thereto and the inorganic powder was dispersed by a sand grinder to thereby prepare a coating composition B. The coating composition B exhibited the same thixotropic viscosity characteristic as that of the coating composition A.

TABLE 1

| content of coating composition A | parts by weight |
| --- | --- |
| Fe powder | |
| particle size (major axis size)0.4 μm | 10 |
| needle-like ratio | 10 |
| polyvinyl chloride copolymer | 4 |
| polymerization degree | 300 |
| cyclohexanone | 30 |

TABLE 2

| content of coating composition B | parts by weight |
| --- | --- |
| SiO$_2$ powder | |
| particle size (major axis size) 0.4 μm | 10 |
| polyvinyl chloride copolymer | 4 |
| polymerization degree | 300 |
| cyclohexanone | 30 |

Table 3 shows results of measurement of surface roughness of coating products obtained by changing the wet thickness of the precoat solution and the wet thickness of the coating composition, respectively.

TABLE 3

| coating composition | precoating composition wet film thickness cc/m$^2$ | coating composition wet film thickness cc/m$^2$ | surface roughness of coated article (Ra) nm | evaluation ranking |
| --- | --- | --- | --- | --- |
| coating composition A | 8.0 | 33.0 | 25 | D |
| | 8.0 | 32.0 | 18 | C |
| | 8.0 | 24.0 | 17 | C |
| | 8.0 | 22.0 | 33 | E |
| | 3.0 | 38.0 | 26 | D |

TABLE 3-continued

| coating composition | precoating composition wet film thickness cc/m$^2$ | coating composition wet film thickness cc/m$^2$ | surface roughness of coated article (Ra) nm | evaluation ranking |
| --- | --- | --- | --- | --- |
| | 3.0 | 9.0 | 18 | C |
| | 3.0 | 8.0 | 32 | E |
| | 1.0 | 3.0 | 16 | C |
| | 1.0 | 2.0 | 34 | E |
| | 0.5 | 2.0 | 17 | C |
| | 0.5 | 1.5 | 16 | C |
| | 0.5 | 1.2 | 35 | E |
| coating composition B | 3.0 | 9.0 | 17 | C |
| | 3.0 | 8.0 | 32 | E |
| coating composition A was coated on coating composition B | 8.0 | 13.0/20.0 | 26 | D |
| | 8.0 | 4.0/20.0 | 18 | C |
| | 8.0 | 3.0/20.0 | 31 | E |
| | 3.0 | 6.0/3.0 | 18 | C |
| | 3.0 | 5.0/3.0 | 33 | E |

(Note)
Evaluation ranking:
A: very superior
B: considerably superior
C: superior
D: usable
E: not-usable Further, in the case where the wet film thickness of the precoat solution is larger than ⅓ the wet film thickness of the coating composition as shown in Table 3, the surface roughness of each of the coating products is evaluated to be bad.

It is apparent that it is sufficient if the wet film thickness of the precoat solution is selected to be not larger than ⅓ the wet film thickness of the coating composition in order to improve the surface quality of the coating film.

Further, it is apparent from results shown in Table 3 that the surface quality of the coating film is improved more and more when the wet film thickness of the precoat solution is not larger than ⅓ the wet film thickness of the coating composition and the total film thickness of the precoat solution and the coating composition is not larger than 40 μm.

After the components shown in Table 1 were kneaded by a kneader, each of the various solvents shown in Table 4 was added thereto by an amount of 5 g per 1 g of inorganic powder and dispersed by a sand grinder to thereby prepare various coating compositions A different in the main solvent. Then, 5 g of methyl ethyl ketone per 1 g of inorganic powder was added thereto and the inorganic powder was dispersed by a sand grinder to thereby prepare the coating compositions.

The viscosity of each of the coating compositions thus prepared was measured by a Rotovisko viscometer. As a result, each of the coating compositions exhibited a thixotropic viscosity characteristic in which the viscosity decreased as the shear speed increased, as shown in the graph of FIG. 3.

Methyl ethyl ketone was used as the precoat solution.

Then, those prepared thus were used in combination so that the precoat solution and the coating composition were applied to film thicknesses of 3 cc/m$^2$ and 10 cc/m$^2$, respectively, and then the surface roughness of each coating film was examined. Results thereof are shown in Table 4. The boiling point of each solvent is also shown in Table 4.

TABLE 4

| main solvent of coating composition | boiling point °C. | surface roughness (Ra) nm | evaluation ranking |
| --- | --- | --- | --- |
| cyclohexane | 156 | 19 | C |
| butyl acetate | 126 | 18 | C |
| isobutyl acetate | 118 | 18 | C |
| toluene | 111 | 16 | C |
| methyl ethyl ketone | 80 | 13 | B |
| ethyl acetate | 77 | 12 | B |
| acetone | 56 | 12 | B |

(Note)
Evaluation ranking:
A: very superior
B: considerably superior
C: superior
D: usable
E: not-usable It is apparent from the results shown in Table 4 that the evaluation rank of the surface roughness of the resulting coating film becomes low in any case where the precoat solution and the coating composition A are used in combination so that the boiling point 80° C. of methyl ethyl ketone as the precoat solution is lower than the boiling point of the solvent of the coating composition A.

It is apparent from this that having the boiling point of the solvent of the precoat solution which is not lower than the boiling point of the main solvent of the coating composition can prevent the surface of the coating film from being roughened.

Various binding agents shown in FIG. 6 were selectively added into a coating composition having components shown in Table 5 so as to prepare various coating compositions different in binding agent from each other. The viscosity of each of the coating compositions thus prepared was measured by using a Rotovisko viscometer. As a result, each of the coating compositions exhibited a thixotropic viscosity characteristic in which the viscosity decreased as the shear speed increased, as shown in the graph of FIG. 3.

TABLE 5

| Content of coating composition | parts by weight |
| --- | --- |
| Fe powder | 10 |
| binding agent | 4 |
| cyclohexanone | 30 |
| methyl ethyl ketone | 50 |

TABLE 6

| precoating composition | binding agent | $\chi$ parameter | surface roughness nm | evaluation ranking |
| --- | --- | --- | --- | --- |
| dioxane | polyvinyl chloride | 0.52 | 17 | C |
| cyclohexanone | polyvinyl chloride | 0.48 | 12 | B |
|  | copolymer | 0.20 | 11 | B |
|  | polyvinyl chloride copolymer containing —OH group | 0.48 | 10 | A |
|  | polyvinyl chloride | 0.48 | 10 | A |

TABLE 6-continued

| precoating composition | binding agent | $\chi$ parameter | surface roughness nm | evaluation ranking |
| --- | --- | --- | --- | --- |
|  | copolymer containing —COOH group | | | |
| ethyl ketone methyl | polyvinyl chloride copolymer containing —SO$_3$Na group | 0.49 | 9 | A |
|  | polyvinyl chloride copolymer containing —OSO$_3$Na group | 0.49 | 8 | A |
|  | polyvinyl chloride copolymer containing —PO$_3$Na$_2$ group | 0.51 | 10 | B |
|  | polyvinyl chloride copolymer containing —OPO$_3$Na$_2$ group | 0.51 | 11 | B |

(Note)
Evaluation ranking of surface roughness:
A: very superior
B: considerably superior
C: superior
D: usable
E: not-usable These coating compositions were used in various combinations with three kinds of precoat solutions shown in Table 6 so that the film thickness of the precoat solution and the film thickness of the coating composition were applied with the ratio of 3 cc/m$^2$ and with the ratio of 10 cc/m$^2$. Table 6 shows results of examination of the surface roughness of the resulting coating film.

It is apparent from the results shown in Table 6 that the surface quality of the coating film is improved by selecting the parameter $\chi$, in the precoat solution, of the binding agent of the coating composition to be smaller than 0.5.

It is further apparent that the surface quality of the coating film is improved when the binding agent contained in the coating composition has at least one kind of polar group selected from polar groups of —OH, —COOH, —SO$_3$M, —OSO$_3$M, —PO$_3$M$_2$, and —OPO$_3$M$_2$ (in which M represents any one of a hydrogen, an alkaline metal and an ammonium group).

After components shown in Table 1 were kneaded by a kneader, 5 g of methyl ethyl ketone per 1 g of inorganic powder was added thereto and the inorganic powder was dispersed by a sand grinder to thereby prepare a coating composition. The viscosity of the coating composition thus prepared was measured by a Rotovisko viscometer. As a result, the coating composition exhibited a thixotropic viscosity characteristic in which the viscosity decreased as the shear speed increased, as shown in the graph of FIG. 3.

Table 7 shows results of measurement of surface quality and adhesive strength of coating films obtained by changing the components of the precoat solution and the thickness thereof. Incidentally, the film thickness of each of the coating compositions was selected to be 18 cc/m$^2$.

TABLE 7

| under coating | composition of precoat | precoat wet film cc/m² | evaluation of surface roughness | evaluation of adhesive strength |
|---|---|---|---|---|
| none | methyl ethyl ketone | 2 | C | C |
| | methyl ethyl ketone + polyvinyl chloride copolymer of 5,000 molecular weight | 2 | C | C |
| | methyl ethyl ketone + polyvinyl chloride copolymer of 10,000 molecular weight | 2 | B | B |
| | methyl ethyl ketone + polyvinyl chloride copolymer of 10,000 molecular weight | 6 | C | A |
| present | methyl ethyl ketone + polyvinyl chloride copolymer of 10,000 molecular weight | 2 | C | B |
| | methyl ethyl ketone + polyvinyl chloride copolymer of 10,000 molecular weight | 1 | B | A |
| | methyl ethyl ketone + polyvinyl chloride copolymer of 5,000 molecular weight | 1 | C | B |

(Note)
1. Evaluation ranking of surface roughness: A: very superior B: considerably superior C: superior D: usable E: not-usable
2. Evaluation ranking of adhesive strength A: very superior B: superior C: fail It is apparent from the results shown in Table 7 that both the surface quality of the coating film and the adhesive strength of the coating film are improved by making the precoat solution contain a binding agent having an average molecular weight of not smaller than 10,000.

It is further apparent that the surface quality and adhesive strength of the coating film are improved more and more when a solvent-mainly-containing undercoat solution containing a binding agent having an average molecular weight of not smaller than 10,000 is applied and dried on a support and the precoat solution is applied thereon.

That is, as is obvious from the aforementioned examples, not only the surface quality of the coating film can be improved greatly but also the strength of adhesion of the coating film against the support can be improved when the wet film thickness of the precoat solution is selected to be not larger than ⅓ of the wet film thickness of the coating composition, the sum of the wet film thickness of the precoat solution and the wet film thickness of the coating composition is selected to be not larger than 40 μm, the boiling point of the main solvent of the precoat solution is selected to be not lower than the boiling point of the main solvent of the coating composition, the parameter $\chi$, in the precoat solution, of the binding agent contained in the coating composition is selected to be smaller than 0.5, the binding agent contained in the coating composition is made to have at least one kind of polar group selected from a plurality of polar groups of —OH, —COOH, —SO₃M, —OSO₃M, —PO₃M₂, and —OPO₃M₂ (in which M represents any one of a hydrogen, an alkaline metal and an ammonium group), the precoat solution is made to contain a binding agent having an average molecular weight of not smaller than 10,000, and a solvent-mainly-containing undercoat solution containing a binding agent having an average molecular weight of not smaller than 10,000 is applied and dried on the surface of the support and the precoat solution is applied thereon.

As described above, according to the present invention, it is estimated that the aggregation of solid particles in the coating composition can be avoided because the occurrence of a solvent shock is prevented by contact between the precoat solution and the coating composition even in the case where solid particles of a magnetic material, or the like, contained in the coating composition are made finer, and it is also estimated that there can be effectively prevented the deterioration of the surface quality of a coating film caused by disorder of the arrangement of the solid particles when the solvent in the precoat solution passes between the solid particles of the coating composition at the time of drying. Accordingly, the occurrence of failures such as the change in thickness of the coating film formed on the surface of the support, the generation of stripes, etc., can be prevented, so that the surface quality of the coating film formed on the surface of the support can be improved greatly. Further, the strength of adhesion of the coating film against the support can be improved by making the precoat solution contain a binding agent having an average molecular weight of not smaller than 10,000.

Accordingly, when the coating method according to the present invention is applied, for example, to production of magnetic recording media, products good in electromagnetic conversion characteristic and durable can be produced stably.

It is contemplated that numerous modifications may be made to the coating method of the present invention without departing from the spirit and scope of the invention as defined in the following claims.

What is claimed is:

1. A coating method for coating a coating surface of a moving support, comprising the steps of:

a) liquid-sealing said support with a precoat solution mainly containing a solvent by applying the precoat solution onto the coating surface of said support in advance; and b) applying at least one coating composition, which is prepared by dispersing inorganic powder of a mean particle size not larger than 0.4 μm, onto said precoat solution by means of an extrusion head having a front edge located at an upstream side with respect to a direction of movement of said support, and a back edge located at a downstream side with respect to the direction of movement of said support so that an end of said back edge is spaced farther from said support with a difference in level than said front edge, wherein said precoat solution has a wet film thickness in a range of from ⅓ to ¹⁄₁₃₀ as large as a wet film thickness of said coating composition, wherein a boiling point of the solvent of said precoat solution is not lower than a boiling point of a main solvent of said coating composition.

2. The coating method according to claim 1, wherein the sum of the wet film thickness of said precoat solution and the wet film thickness of said coating composition is in a range of from 1.2 μm to 40 μm.

3. The coating method according to claim 1, wherein said precoat solution is applied onto an undercoat layer contained in said support and formed of a high-molecular compound having an average molecular weight of from 10,000 to 500,000.

4. The coating method according to claim 1, wherein a parameter $\chi$ of a binding agent in said precoat solution is smaller than 0.5, where the parameter $\chi$ is expressed by $\chi = 0.5 - A2 \cdot V \cdot \rho^2$ in which A2 is a second virial coefficient, V is the molar volume of the solvent, and $\rho$ is polymer density.

5. The coating method according to claim 1, wherein a binding agent contained in said coating composition has at least one kind of polar group selected from polar groups of —OH, —COOH, —SO$_3$M, —OSO$_3$M, —PO$_3$M$_2$, and —PO$_3$M$_2$, (where M represents any one of a hydrogen atom, an alkaline metal atom or an ammonium group).

6. The coating method according to claim 1, wherein said precoat solution contains a high-molecular compound having an average molecular weight of from 10,000 to 500,000.

* * * * *